US006437089B1

(12) United States Patent
Cohen et al.

(10) Patent No.: US 6,437,089 B1
(45) **Date of Patent: *Aug. 20, 2002**

(54) PROCESS FOR THE PRODUCTION OF NYLON 6

(75) Inventors: Jeffrey D. Cohen, Kennett Square, PA (US); Stuart B. Fergusson; Ernest Keith Marchildon, both of Kingston (CA); David N. Marks, Newark, DE (US); Ahmet Turgut Mutel, Kingston (CA)

(73) Assignee: E. I. Du Pont de Nemours and Company, Wilmingotn, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/872,298

(22) Filed: Jun. 1, 2001

(51) Int. Cl.[7] ........................ C08G 69/08; C08G 69/14; C08G 73/10; C07D 201/02

(52) U.S. Cl. ........................ 528/310; 528/313; 528/319; 528/320; 528/323; 540/539

(58) Field of Search ................................ 528/310, 313, 528/319, 320, 323; 540/539

(56) References Cited

U.S. PATENT DOCUMENTS

| | | | | |
|---|---|---|---|---|
| 2,245,129 A | | 6/1941 | Greenewalt | |
| 2,357,484 A | | 9/1944 | Martin | |
| 4,568,736 A | | 2/1986 | Curatolo et al. | |
| 5,693,793 A | * | 12/1997 | Ritz et al. | 540/539 |
| 5,739,324 A | | 4/1998 | Fuchs et al. | |
| 6,069,228 A | | 5/2000 | Alsop et al. | |
| 6,194,538 B1 | | 2/2001 | Weiss et al. | |
| 6,201,096 B1 | | 3/2001 | Marchildon et al. | |
| 6,222,033 B1 | * | 4/2001 | Fuchs et al. | 540/539 |

OTHER PUBLICATIONS

Database CAPLUS on STN, Acc. No. 1998:728736, Fuchs et al., 'Method for preparing lactams from amino nitriles.' DE 19718706 (abstract).*

* cited by examiner

*Primary Examiner*—Brian J. Davis

(57) ABSTRACT

Process for making nylon 6 in which a feed stream containing a major portion of caprolactam and/or nylon 6 prepolymer and a minor portion of aminocapronitrile is fed to a multistage reactive distillation column in which the feed stream flows countercurrently to a steam stream.

8 Claims, 5 Drawing Sheets

PROCESS FOR THE PRODUCTION OF NYLON 6

BACKGROUND OF THE INVENTION

1. Field of the Invention

The present invention relates to a process for the production of nylon 6 in which a feed stream that contains a major portion of caprolactam and/or nylon 6 prepolymer and a minor portion of 6-aminocapronitrile is fed directly to a multistage reactive distillation column where it is reacted with a contercurrently flowing steam stream.

2. Related Art

Nylon-6 is produced commercially using caprolactam as the starting material. This process typically involves heating caprolactam in a VK tube at atmospheric pressure for 12 to 24 hours. This process produces a nylon-6 product that contains 7 to 10% caprolactam in the product. Excess caprolactam is extracted using an 8 to 12 hour aqueous extraction process. The extracted product is then dried for 8 to 12 hours producing a dry product containing 0.2 to 0.3% caprolactam. While this process has met with commercial success, the purification of the nylon-6 product adds a considerable expense to the process.

U.S. Pat. No. 2,245,129 discloses a process for the production of polyamides by a two step process that first reacts an aminonitrile compound with water in a closed vessel to produce a low molecular weight polyamide product. In a second step, heating the product with venting to remove ammonia and excess water increases the product's molecular weight. A disadvantage of this process is long reaction times and difficulty achieving desirable molecular weights.

U.S. Pat. No. 6,069,228 discloses a process for the conversion of 6-aminocapronitrile to nylon-6 using a pipeline reactor. One disadvantage to the pipeline process is that it requires long residence times that can lead to product degradation.

U.S. Pat. No. 6,201,096 discloses a process for the production of a polyamide by reaction of an omega-aminonitrile with water in a vertical multistage reactor that is swept by steam. For example, this process can convert 6-aminocapronitrile to nylon-6. Complete hydrolysis of the large number of nitrile ends requires residence times of 2 to 4 hours.

U.S Pat. No. 2,357,484 discloses a catalyzed vapor phase process for high conversion and rapid hydrolysis of the nitrile group in 6-aminocapronitrile to produce caprolactam. Because of the residual 6-aminocapronitrile that remains in the caprolactam product, it must be purified before using in a conventional polymerization.

It would be desirable to have a process for the conversion of 6-aminocapronitrile to nylon-6 that does not require long liquid residence times that can lead to product degradation and does not require additional purification steps.

SUMMARY OF THE INVENTION

The present invention is a process for the production of nylon 6 which comprises:

a) (1) contacting either steam or liquid water and 6-aminocapronitrile in the presence of a dehydration catalyst to produce a first feed stream comprising a major portion of caprolactam and a minor portion of 6-aminocapronitrile, or (2) contacting 6-aminocapronitrile and water at elevated temperature and superatmospheric pressure to produce a second feed stream comprising a major portion of nylon 6 prepolymer having more than about 40 gram equivalents of untreated nitrile end groups per million grams of nylon 6 prepolymer, and a minor portion of 6-aminocapronitrile;

b) providing a vertical countercurrent multistage reactor having a top and a bottom, and having upper stages and lower stages, said reactor being equipped with internal perforated barrier means for establishing a plurality of stages and for effecting contact of said first and/or second feed stream with a countercurrently-flowing steam stream;

c) introducing at least one of said first and second feed streams directly into said reactor at or near the top of said reactor;

d) introducing steam into said reactor at at least one introduction point near the bottom of said reactor;

e) maintaining a pressure within said reactor between 50 and 800 psig (0.34 and 5.52 MPa) and a temperature at the top of said reactor between 190 and 250 degrees C. and a temperature at the bottom of said reactor between 260 and 290 degrees C.;

f) withdrawing a steam-containing overhead stream at the top of said reactor; and g) recovering a product stream from the bottom of said reactor, said product stream comprising nylon 6 polymer having less than about 20 gram equivalents of unreacted nitrile end groups per million grams of nylon 6.

By introducing directly into the vertical multistage reactive distillation column the product of the reaction step that produces the feed containing mostly caprolactam (first embodiment), a process is provided that should not need an additional costly purification step of an intermediate product.

By introducing directly into the vertical multistage reactive distillation column the product of the reaction step that produces the feed containing mostly nylon 6 prepolymer (second embodiment), a process is provided that should not need excessively long liquid residence times that can lead to degradation reactions.

DETAILED DESCRIPTION OF INVENTION

Figure 1:
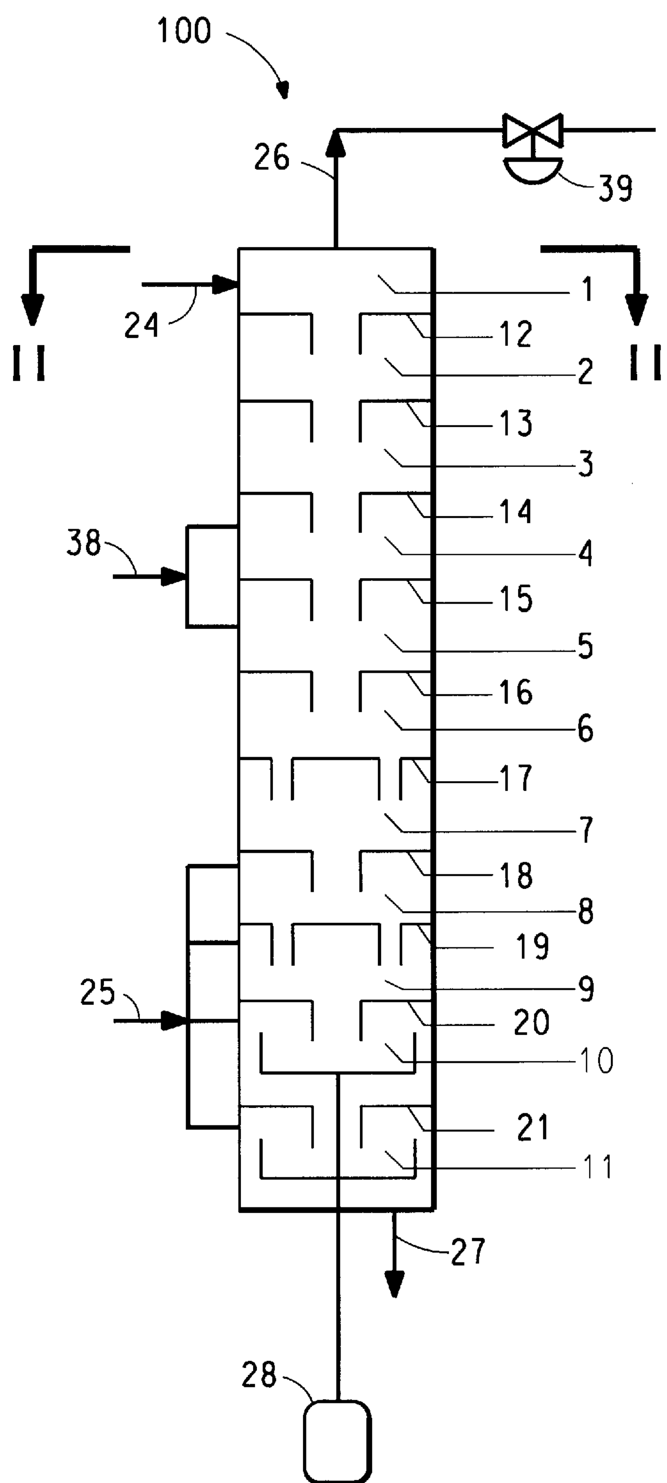
FIG. 1 is a schematic cross-sectional side-view of one embodiment of a vertical multistage reactor useful for performing the continuous polymerization process according to the present invention.

The process of the current invention is a continuous process for preparing nylon 6 by first forming a feed stream by either (1) or (2), and then reacting either or both of the feed stream(s) with a contercurrently flowing steam stream in a vertical, multistage, reactive distillation column reactor. The term "vertical" is meant to denote that the reactor is situated such that gravity will cause the feed stream(s) to flow in a generally downward direction inside the column. The 6-ACN in the feed streams will be hydrolyzed by reaction with dissolved water that is supplied and replenished by the steam flowing in the reactor countercurrently to the direction of flow of the feed stream(s)

Saturated steam, steam containing a small amount of water, or superheated steam at a temperature up to about that of the liquid within the reactor at the point where the steam enters, is fed continuously to one or more of the lower stages of the column reactor.

A feed containing a minor portion of 6-ACN ("minor portion" denotes between about 0.4 and about 20 weight percent relative to the weight of all organic materials in the feed stream) and a major portion of at least one of caprolactam or nylon 6 prepolymer ("major portion" denotes more than about 50 weight percent of all organic materials in the feed stream) is fed continuously near the top of a multistage column reactor. The feed can include other species that react to form polyamides and optionally water or steam.

The feed is supplied to the column at a temperature that most facilitates the establishment and maintenance of the desired temperatures in the column. The feed temperature generally is between the temperature required to keep the feed substantially in the molten state (i.e. where it is capable of being pumped) and the temperature of the liquid within the column at the point of entry.

The feed can include a catalyst. Oxygen-containing phosphorus compounds such as those disclosed in Curatolo et al. U.S. Pat. No. 4,568,736 are preferred. For example, phosphorous acid, alkyl- and aryl-substituted phosphonic acid, hypophosphorous acid, phosphoric acid, mixtures thereof and the like can be used. Any phosphorus compound that hydrolyzes to an oxygenated phosphorus acid or a salt during the reaction also can be used. The oxygen-containing phosphorus catalysts are typically added at a weight percent, relative to all organic materials in the feed, of 0.05 to 0.3, preferably 0.1 to 0.2. Preferred catalysts include phosphoric acid, phosphorous acid, phenyl phosphinic acid, and 2-(2'-pyridyl) ethyl phosphonic acid.

The feed should be fully or largely soluble in the liquid within the upper two thirds of the column reactor under the conditions of temperature, pressure and liquid composition existing there, and fully soluble under the conditions in the bottom one-third of the reactor.

The feed can contain other polyamide-forming monomers and oligomers, which will react to form a polyamide. Among such monomers are those which possess amide-forming capability, such as lactams, aminoalkylamides and aminoacids. Examples are 6-aminocaproamide, and 6-aminocaproic acid. Another class of monomers includes those which must be added in combination with other monomers in order to form amide links. Such monomers are diacids, diamines, diamides and dinitriles. Examples are adipic acid, hexamethylenediamine, adipamide, and adiponitrile. These other components can be added as a liquid or as a solid slurried in with the feed. All of the components should be fully or largely soluble in the column reactor under the conditions of temperature, pressure, and liquid composition within the column and fully soluble under conditions in the bottom one-third of the reactor.

In one embodiment, the feed stream is the reaction product of the catalyzed hydrolysis of 6-aminocapronitrile. Processes have been described for the catalyzed conversion of 6-aminocapronitrile to caprolactam, both in the liquid phase and the gas phase. For example, U.S. Pat. No. 5,739,324, describes a process for preparing caprolactam by reacting 6-aminocapronitrile with water at 140 to 320 degrees C. in the liquid phase in the presence of a heterogeneous catalyst, such as titanium dioxide, zirconium oxide, cerium oxide or aluminum oxide. The product of this reaction is mostly caprolactam, with from 10% to less than 1% 6-aminocapronitrile, in most cases less than 5% 6-aminocapronitrile. U.S. Pat. No. 2,357,484 describes reacting aminocapronitrile with water in the vapor phase over a dehydration catalyst to produce caprolactam in up to 99.9% conversion. The temperature and pressure of the reaction were chosen to keep reactants and products in the vapor phase. Typical conditions were one atmosphere pressure and a temperature of about 300 degrees C. or greater. Suitable materials for catalyzing the reaction were solids having dehydrating properties. Examples of such catalysts included metallic oxides such as aluminum oxide, thorium oxide, cerium oxide, zirconium oxide, titanium dioxide, chromium sesquioxide, blue tungsten oxide, beryllium oxide, uranous oxide, vanadium oxide, magnesia, blue molybdenum oxide, ferrous oxide and the like; certain non-metallic oxides such as silica, boron oxide and the like; salts such as sulfates, phosphates and the silicates of aluminum, thorium, cerium, zirconium and magnesium; and acidic substances, such as phosphoric acid and heteropoly acids, for example, silicotungstic acid, phosphomolybdic acid and borophosphoric acid.

The feed that is produced in this first embodiment will be fed directly to the vertical multistage reactive distillation column reactor. The term "directly" is meant to denote that the mostly caprolactam feed stream will not be purified to remove the residual 6-aminocapronitrile.

In another embodiment, the feed stream is the product of reacting 6-aminocapronitrile with water under conditions where the product contains a major portion of nylon 6 prepolymer and a minor portion of 6-aminocapronitrile. The term "nylon 6 prepolymer" is meant to denote nylon 6 having a number average molecular weight of less than or equal to about 2000. U.S. Pat. No. 6,194,538 describes a process in which 6-aminocapronitrile is reacted with water at a temperature from 250 to 350 degrees C. and a pressure from 4 to 30 MPa to produce nylon 6 prepolymer. This product is characterized by a nitrile conversion of not less than 95 mol %, more preferably in the range of 97 to 99 mol %.

The feed that is produced in this second embodiment will be fed directly to the vertical multistage reactive distillation column reactor. Here, the term "directly" is meant to denote that the mostly nylon 6 prepolymer stream will not be subjected to further reaction steps to reduce the level of 6-aminocapronitrile.

Standard mutistage reactive distillation columns are suitable for use in the process of the current invention if the residence times of the liquid phases in the stages are increased to give sufficient time for hydrolysis of the nitrile groups of the feed components. The required liquid residence time in the reactor is expected to be between about 0.5 hour and 2 hours to achieve appropriate nitrile hydrolysis.

The column reactor should be equipped with internals, such as, but not limited to, perforated plates and agitators, to cause effective staged contact of the countercurrently flowing steam with the feed stream to ensure substantially complete hydrolysis of the nitrile groups and removal of ammonia generated by chemical reaction.

Figure 2:
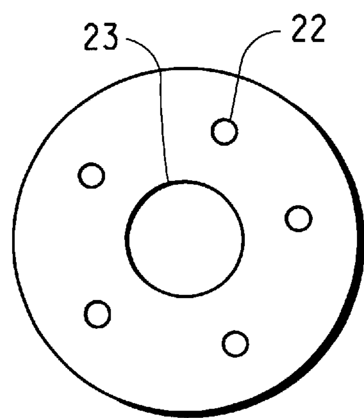
FIG. 2 is a cross-sectional view of the vertical multistage reactor of FIG. 1 as seen through lines II—II.

Referring now to FIG. 1, the interior of a multistage cloumn reactor 100, suitable for use in the current invention, is divided into discrete stages 1 to 11 using perforated barrier means 12 to 21 between the stages. Referring to FIG. 2, the barrier means can be plates that include small perforations 22 that allow vapor to flow upward from stage to stage, and at least one larger downcomer tube 23 that leads from each stage into and below the surface of the liquid phase in the stage below, thereby allowing liquid to flow downward from stage to stage. The number of stages is chosen to achieve a high rate, per unit of liquid volume, of mass transfer and chemical reaction. Five to fifteen stages are typical.

Figure 3:
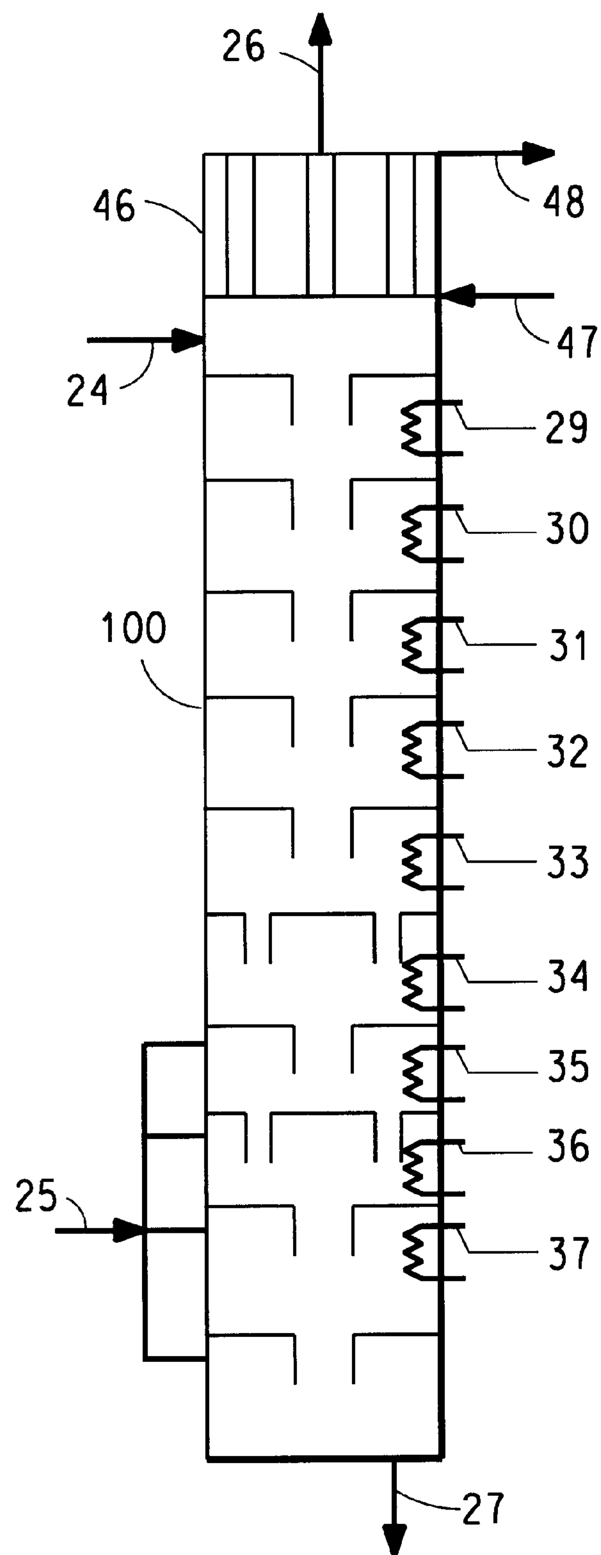
FIG. 3 is a schematic cross-sectional side-view of a vertical multistage reactor illustrating the presence of an independent heating element 29–37 at each reactor stage and the presence of a partial condenser at the top of the column.

Referring again to FIG. 1, the feed 24 is fed continuously at or near the top of the multistage column reactor 100, and steam 25 is fed continuously to one or more of the bottom-most stages of the reactor. The steam can be saturated steam, steam containing a small amount of water, or superheated steam, with superheated steam being preferred in order to minimize the heating requirement within the reactor. Steam and ammonia vapor are removed at the top of the column as vapor stream 26. Nylon 6 product 27 is continuously removed from the bottom stage 11. The column preferably includes means to separate and return to the column any 6-ACN and/or caprolactam which leaves the top part of the column as a vapor or as an entrained liquid. One such means is a partial condenser 46 at the top of the column, as shown in FIG. 3. By manipulating the flow and temperature of cooling fluid into 47 and out of 48 the cooling side of the partial condenser, the condenser 46 can be maintained at a temperature sufficient to condense and return most of the 6-ACN and/or caprolactam to the column, while allowing steam and ammonia to be removed in vapor stream 26. Additionally, one or more stages can be added to the column reactor above the feed stage, and a partial condenser can be provided above the uppermost of these stages to provide reflux liquid.

The temperature in the column should be maintained sufficiently high that the reaction mixture does not freeze. The temperature at the top stage 1 of the column is maintained at a lower temperature than the temperature at the bottom stage 11. The top temperature is maintained at a temperature that is high enough to achieve a good rate of hydrolysis of the nitrile groups on the 6-ACN and/or nylon 6 prepolymer, but low enough to avoid excessive volatilization of 6-ACN and/or caprolactam. It is possible to use a combination of upper stage temperature and a partial condenser to minimize outflow of these two reactants. The temperature of bottom stage 11 is adjusted high enough to obtain an adequate polymerization rate, but not so high as to cause degradation. For example, secondary amines can form when amine ends condense with each other. Secondary amines are undesirable because they create branch points in the nylon 6 polymer, which can lead to loss of desirable properties in use. The potential for forming secondary amines exists throughout the column; therefore, it is important that the average temperature in the stages not exceed a value above which the formation of secondary amines becomes detrimental to the product. Averaging over the bottom two-thirds of the reactor, this temperature is approximately 265° C. Because the hydrolysis reaction is exothermic, the column is optionally equipped with means for water injection 38 at all or selected stages for temperature control.

The top stage is preferably maintained between about 190° C. and 220° C. when using catalyst, and between 230 and 250° C. when not using catalyst. The bottom stage is preferably maintained between about 260° C. and 290° C. All or most stages are preferably equipped with means for independent control of temperature. This control is best accomplished by use of a hot flowing liquid heat transfer medium passing through jackets, coils, or other heat-transfer devices 29 to 37, which can be used for both heating and cooling, as shown in FIG. 3.

The column is operated at elevated pressure, preferably above 50 psig (0.34 MPa), more preferably 100 to 300 psig (0.69 to 2.07 MPa) with catalyst, and 400 to 800 psig (2.76 to 5.52 MPa) without catalyst to obtain substantially complete hydrolysis of the nitrile ends of the 6-ACN and nylon 6 prepolymer. Substantially complete hydrolysis is required to obtain good quality nylon 6 polymer. The nylon 6 product should contain less than about 20 gram-equivalents of unhydrolyzed nitrile ends per million grams of polymer, so that the polymer can be further processed to raise its molecular weight to the highest average molecular weight required for a particular end use. The pressure can be controlled by means of a pressure control valve 39, the opening of which is continuously adjusted to vary the outflow of vapor stream 26 in response to the measured pressure in the vessel. Under the conditions of temperature, concentration of water, amine functional groups and catalyst in the reactor, nitrile ends are largely converted, in combination with amine functional groups, into amide linkages, with consumption of water and release of ammonia. The ammonia is removed from the reactor in vapor stream 26.

One of the advantages of the present invention is expected to be that steam will continually flush ammonia away from the lower parts of the reactor, up through the upper parts and out the top exit as part of vapor stream 26. The concentration of ammonia in the lower part of the column reactor should be minimized for two reasons. First, ammonia can react with and break amide linkages, hence limiting the growth of nylon 6 polymer molecular weight. Second, ammonia in the vapor phase will reduce the partial pressure of steam in the vapor phase and hence the concentration of water, which can reduce the rate of nitrile hydrolysis. These two effects can be especially damaging in the lower part of the reactor, where amide linkages are highest and where the rate of nitrile hydrolysis is already slow because few nitrile ends are left.

In the upper stages of the column, the viscosity of the reaction mixture should be low enough that with appropriate design of the perforated barriers 12 to 21, gas bubbles from the steam and ammonia vapor will cause effective mixing in the reaction mixture. At the bottom of the column, where the viscosity is highest, a mixer 28 is preferably used in one or more of the bottom-most stages. In the reactor shown in FIG. 1, mechanical mixing is provided in the bottom two stages.

Preferably, to minimize liquid by-pass between the stages, mixing in each stage is induced by either proper arrangement of coils, to assist gas induced mixing, or by mechanical agitation in lower stages, where gas mixing is not sufficient due to high viscosities. Liquid by-pass reduces the desired reaction efficiency requiring a larger size reactor to achieve the same conversion at a given flow rate. Liquid by-pass also may cause increased ratio of side reactions to preferred reaction, resulting in nylon 6 polymer quality problems. Height-to-diameter ratio for each stage is preferably between 0.5 to 1.2 to achieve appropriate mixing efficiency.

Axial mixing between the stages in the column reactor (as a result of liquid backflow through the downcomers induced by large bubbles either entering the downcomers or forcing liquid into the downcomers as they approach the downcomers) will reduce the overall nitrile conversion efficiency in the column reactor. This will result in a requirement for a larger size reactor to achieve the same conversion at a given flow rate. It also may cause an increased ratio of side reactions to preferred reaction, resulting in quality problems. The following preferred arrangements of downcomers can be employed in the multistage column reactor.

Figure 6:
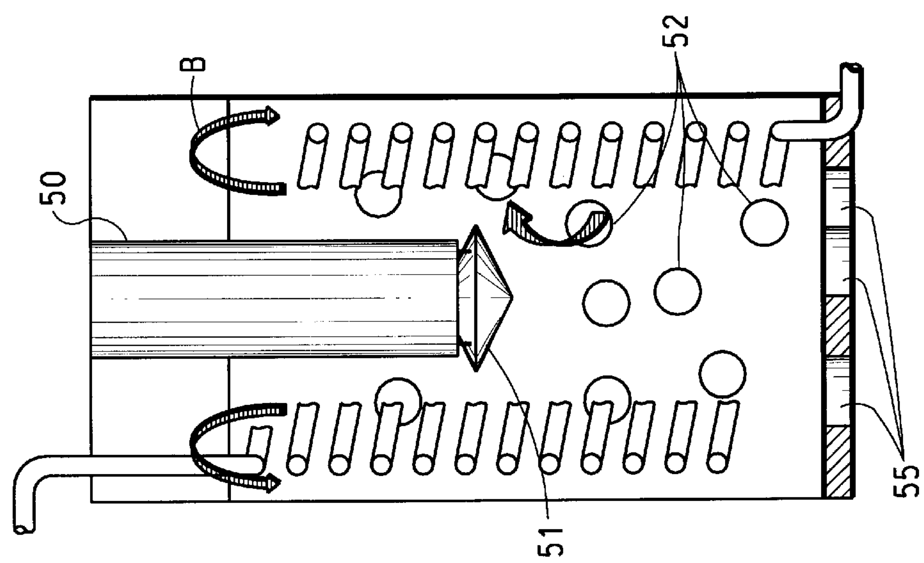
FIG. 6 is a schematic cross-section side-view of a reactor stage containing a circular central downcomer having a bi-conical attachment at the bottom to deflect gas bubbles.

Referring now to FIG. 6, a circular central downcomer 50 is provided with a bi-conical attachment 51 at the bottom to deflect gas bubbles 52 away from the downcomer, prevent them from entering the downcomer, and deflect liquid exiting the downcomer. The gap between the attachment 51 and the bottom of the downcomer 50 is important to minimize liquid backflow in the downcomer induced by the pressure field created by the gas bubbles travelling near the downcomer exit. The gap is adjusted such that the pressure drop created by liquid flow is between 0.5 to 1.0 inches of liquid.

Figure 8:
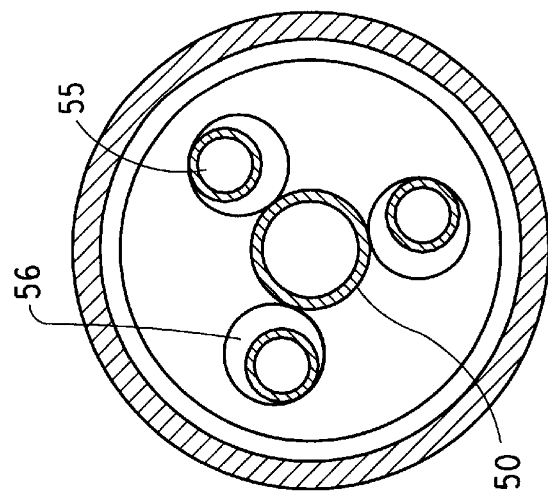
FIG. 8 is a cross-sectional view of the vertical reactor stage of FIG. 7 stacked on top of the vertical reactor stage of FIG. 6 as seen through lines VIII—VIII.
Figure 7:
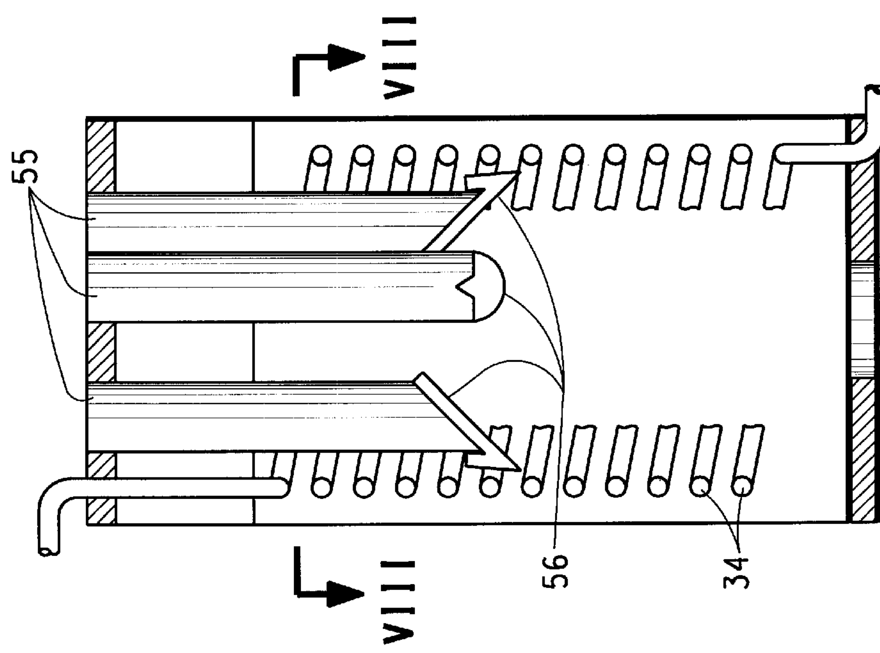
FIG. 7 is a schematic cross-section side-view of a reactor stage containing multiple downcomers arranged in a triangular pattern wherein each downcomer is truncated at an angle with an extended ellipsoidal plate to deflect gas bubbles.

Another preferred arrangement involves multiple downcomers 55 arranged in a triangular pattern, as illustrated in FIG. 7. The bottoms of these downcomers 52 are truncated at an angle between 30 to 60 degrees, and each downcomer is provided with a welded extended ellipsoidal plate 56 to deflect gas bubbles. Liquid is allowed to exit through a rectangular slit protected by the extended plate and pressure dissipating attachment. Slit dimensions are arranged to have a pressure drop of between 0.5 inches to 1.0 inch liquid to minimize backflow. The preferred arrangement of downcomers 55 with respect to each other is shown in FIG. 8 to achieve maximum mixing efficiency in a stage.

Preferably the reactor stages are configured as flooded trays to facilitate an agitator shaft to pass through the downcomers so that liquid can still pass through the downcomers from one stage to the next lower stage. Typically, mechanical mixing is required at the bottom two or three stages of the reactor to minimize liquid by-pass. In these stages mixing induced by gas traffic (as implied by flow arrows in FIG. 6) may not be sufficient to achieve appropriate mixing because of the high viscosities encountered. Weir trays can be used in stages above those lower stages in which agitation is employed. However, flooded trays are preferred, because they allow measurement of liquid level in the uppermost stage, and the liquid level can be taken into account to control flow rate of feed to the column.

Figure 5:
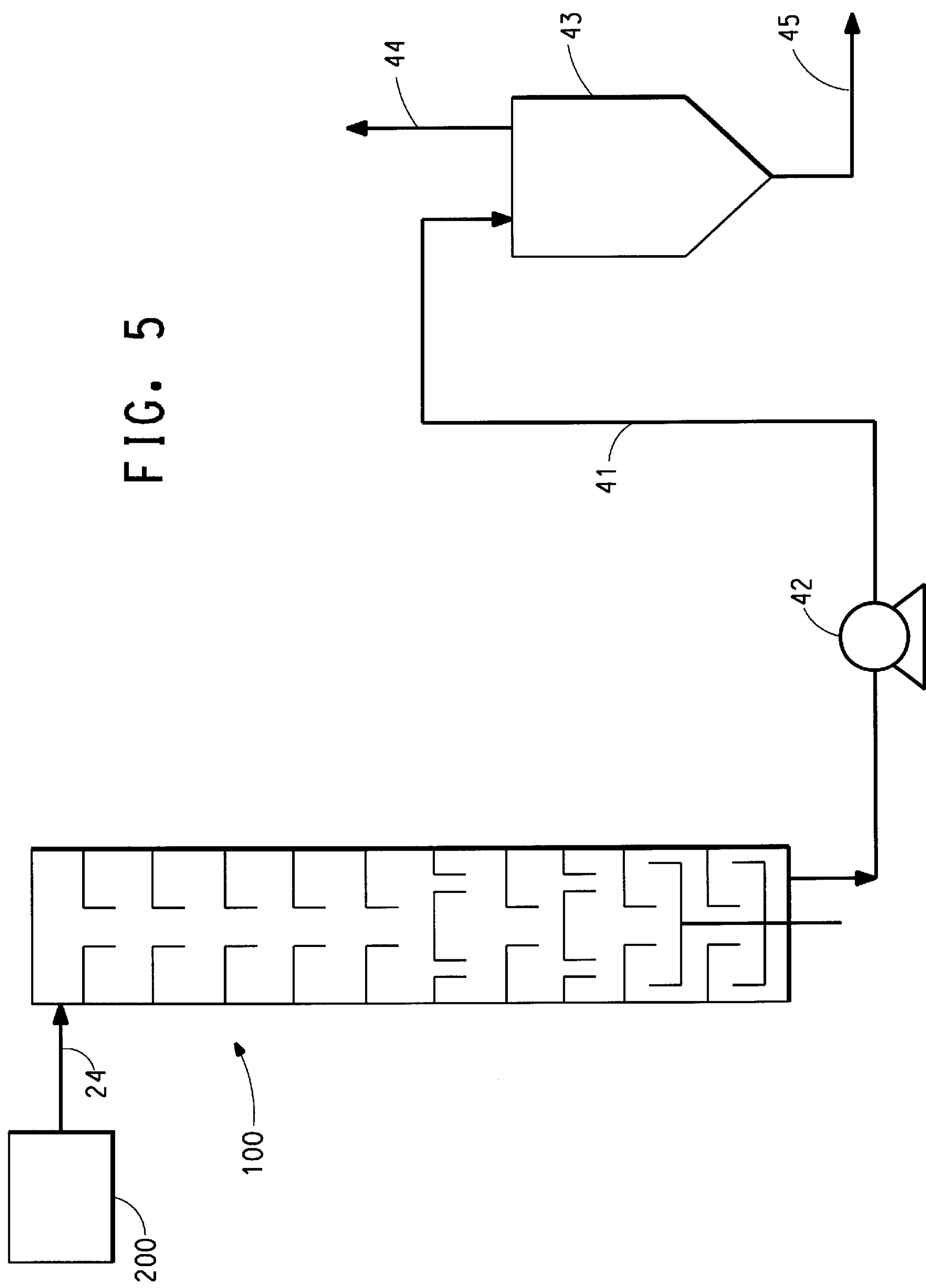
FIG. 5 schematically illustrates a prereactor for making a 6-aminocapronitrile-containing feed and one preferred method of treating the product exiting the multistage reactor column so as to separate water vapor 44 from a liquid product stream.

The nylon 6 product 27 removed from the bottom of the column is expected to have a number-average molecular weight of between about 3,000 and 8,000 and a relative viscosity (RV) between about 6 and 16. The product should contain a content of dissolved water more or less proportional to the pressure of the column reactor. At typical pressures of operation, this water is enough to disrupt most methods of pelletization. Consequently, means should be provided, following the column reactor, to reduce the pressure of the nylon 6-containing product to reduce the water content by volatilization. A preferred method, shown in FIG. 5, is to pass the product through a pipe 41 that is (1) sized to bring about most of the reduction in pressure by means of frictional resistance to flow and (2) heated to compensate for the heat of vaporization. The pipe is usually preceded by a valve or a pump 42 to control flow rate. At the end of the pipe is a vessel 43 or a wider section of pipe, sized to allow almost complete separation of vapor 44 and liquid 45. This separation is carried out at a pressure low enough to at least reduce the water content to the level where the nylon 6 polymer can be pelletized. This pressure could be above atmospheric pressure. More typically, the separator is operated at atmospheric pressure or under vacuum. The separator 43 is heated to maintain the polymer in the molten state and to establish an optimum temperature, typically between about 270° C. and 285° C., to accomplish further removal of dissolved moisture without causing undue degradation of the polymer. Separator 43 is preferably agitated to enhance further removal of dissolved water and to provide blending. The vapor 44 which contains low molecular weight cyclic oligomers and steam can be recycled. The nylon 6 polymer can be held in the separator to increase its viscosity to values suitable for the desired end use, for example about 50 for apparel fiber and molding applications, about 60 to 70 for carpet fiber, and about 70 and higher for industrial fiber. Operating the separator under vacuum will further increase the molecular weight of the nylon 6 product. The nylon 6 product 45 removed from the separator can be pelletized using methods known in the art, such as strand casting. If higher relative viscosity (RV) is desired, the pelletized nylon 6 product can be solid phase polymerized by heating the pellets in a flowing inert atmosphere such as nitrogen or in superheated steam, using methods known in the art.

Figure 4:
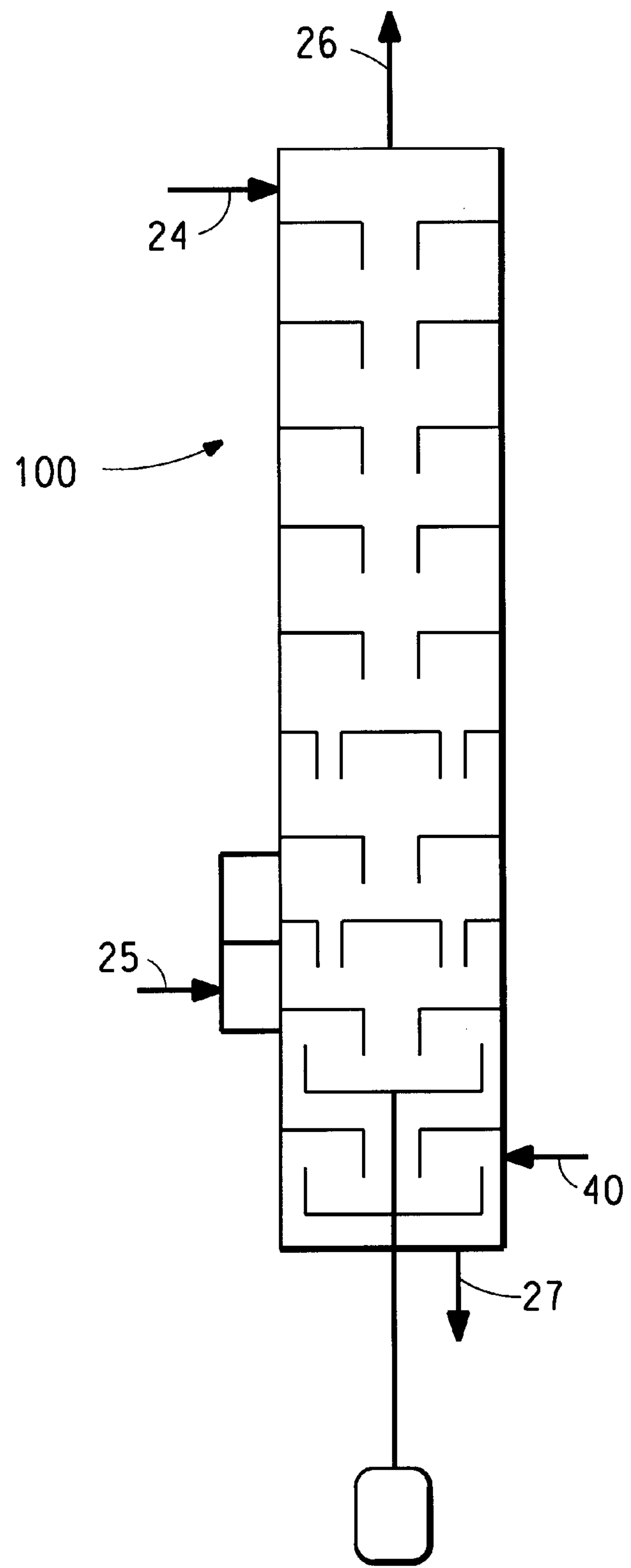
FIG. 4 is a schematic cross-sectional side-view of a vertical multistage reactor illustrating a method of reducing moisture content of the polymer product by supplying nitrogen 40 to the reactor column.

An alternative method of reducing the moisture content of the polymer, with the objective of making it pelletizable, is to supply nitrogen 40 to the column reactor at one or more locations below the bottom-most point of steam injection, as shown in FIG. 4.

EXAMPLES

The following examples are presented to more fully demonstrate and further illustrate various individual aspects and features of the present invention. The examples are illustrative and non-limiting. Test Methods:

The nylon 6 described in the Examples would be analyzed for amine and acid ends by the methods described on pages 293 and 294 in volume 17 of the "Encyclopedia of Industrial Chemical Analysis" published by John Wiley & Sons, Inc. in 1973. Nitrile ends would be measured by infra-red absorption in the range of 2240–2245 $cm^{-1}$.

The relative viscosity (RV) of the polyamide samples would be measured as the ratio of the viscosity of a solution of 8.4 wt % polymer in a solution of 90 wt % formic acid and 10 wt % water at 25° C., to the viscosity of the formic acid-water solution, measured in the same units at 25° C.

The following examples were generated by the use of a mathematical model of the process, which includes the necessary mass and energy balances, along with reaction kinetics and equilibria, mass transfer and tray hydraulics.

Example 1

The feed that contains a major portion of nylon 6 prepolymer and a minor portion of 6-aminocapronitrile would be prepared by mixing water and 6-aminocapronitrile and reacting them in a pipeline reactor under conditions of high pressure and temperature. 400 psig and 270 degrees centigrade would be suitable. The residence time would be selected such that the majority of the 6-aminocapronitrile would be converted to nylon 6 prepolymer but some 6-aminocapronitrile would remain. This feed material would be fed directly to the counter-current column reactor.

The counter-current column with 4 stages was simulated using the mathematical model and the feed material. A mixture containing a nylon 6 prepolymer, caprolactam (9.7 weight percent) and water (4.60 weight percent) would be fed to the column at a rate of 44.96 lb/hr. The prepolymer would contain 38 gram equivalents of nitrile end groups per million grams of prepolymer, 191 gram equivalents of acid end groups per million grams of prepolymer, 725 gram equivalents of primary amide end groups per million grams of prepolymer and 954 gram equivalents of amine end groups per million grams of prepolymer. This mixture would be continuously fed to the top stage of the reactor, which would be maintained at 250° C. Superheated steam would be injected at the bottom stage of the reactor at a rate of 32 lb/hr. The column pressure would be controlled at 250 psig (1.72 MPa) and the column temperature would be increased to 265 degrees C. at the bottom stage. The temperature of the second stage from the top would be held at 255 degrees C. and the third stage from the top would be held at 260 degrees C. The liquid hold up time would vary between 25 and 30 minutes per stage, and the total liquid hold up time in the column would be 1.75 hours.

A vapor is expected to leave the top stage entering the partial condenser at a rate of 31 lb/hr. This vapor is predicted to contain 2.04% by weight ammonia, 0.001% by weight 6-aminocapronitrile and 97.5% by weight steam. The mathematical model predicts that nylon 6 product stream will be produced at the bottom of the reactor at a rate of 46 lb/hr. This stream will contain 5.4% by weight water. The model predicts that the end groups will be as follows: 17 gram equivalents of nitrile end groups per million grams of polymer, 292 gram equivalents of acid end groups per million grams of polymer, 4 gram equivalents of primary amide end groups per million grams of polymer and 313 gram equivalents of amine end groups per million grams of polymer. The RV of the product is predicted to be 6.00.

Example 2

The feed that contains a major portion of caprolactam and a minor portion of 6-aminocapronitrile would be prepared by mixing water and 6-aminocapronitrile and reacting them in over a suitable dehydration catalyst in the vapour phase. 1 atmosphere pressure and 300 degrees centigrade would be suitable reactor conditions. The product of this reaction step would contain a majority of caprolactam and a minority of 6-aminocapronitrile. This material would be fed directly to the counter-current column reactor without the purification of the caprolactam to remove the residual 6-aminocapronitrile.

The counter-current column with 5 stages was simulated using the mathematical model and the feed material from the reactor described above. A mixture containing a caprolactam (89.6 weight percent), 6-aminocapronitrile (0.4 weight percent) and water (10 weight percent) would be fed to the column at a rate of 40 lb/hr. The feed would contain 40 gram equivalents of nitrile end groups per million grams of feed. This mixture would be continuously fed to the top stage of the reactor, which is maintained at 240°) C. Superheated steam would be injected at the bottom stages of the reactor at a total rate of 31 lb/hr. The column pressure would be controlled at 250 psia (1.72 MPa) and the column temperature would be increased to 260 degrees C. at the bottom stage. The temperature of the second stage from the top would be held at 245 degrees C., the third stage from the top would be held at 250 degrees C. and the fourth stage from the top would be held at 255 degrees C. The liquid hold up time would vary between 29 and 34 minutes per stage, and the total liquid hold up time in the column is 2.55 hours.

A vapor is expected to leave the top stage entering the partial condenser at a rate of 34 lb/hr. This vapor is predicted to contain 0.08% by weight ammonia, 0.002% by weight 6-aminocapronitrile and 99.4% by weight steam. The mathematical model predicts that nylon 6 product will be produced at the bottom of the reactor at a rate of 38 lb/hr. This nylon 6 stream is predicted to contain 5.77% by weight water and 8.11% by weight caprolactam. The model predicts that the end groups will be as follows: 17 gram equivalents of nitrile end groups per million grams of polymer, 272 gram equivalents of acid end groups per million grams of polymer, 2 gram equivalents of primary amide end groups per million grams of polymer and 291 gram equivalents of amine end groups per million grams of polymer. The RV of the product is predicted to be 6.4.

What is claimed:

1. A process for the production of nylon 6 which comprises:

a) (1) contacting either steam or water and 6-aminocapronitrile in the presence of a dehydration catalyst to produce a first feed stream comprising a major portion of caprolactam and a minor portion of 6-aminocapronitrile, or (2) contacting 6-aminocapronitrile and water at elevated temperature and superatmospheric pressure to produce a second feed stream comprising a major portion of nylon 6 prepolymer having more than about 40 gram equivalents of untreated nitrile end groups per million grams of nylon 6 prepolymer, and a minor portion of 6-aminocapronitrile;

b) providing a vertical countercurrent multistage reactor having a top and a bottom, and having upper stages and lower stages, said reactor being equipped with internal perforated barrier means for establishing a plurality of stages and for effecting contact of said first and/or second feed stream with a countercurrently-flowing steam stream;

c) introducing at least one of said first and second feed streams directly into said reactor at or near the top of said reactor;

d) introducing steam into said reactor at at least one introduction point near the bottom of said reactor;

e) maintaining a pressure within said reactor between 50 and 800 psig (0.34 and 5.52 MPa) and a temperature at the top of said reactor between 190 and 250 degrees C. and a temperature at the bottom of said reactor between 260 and 290 degrees C.;

f) withdrawing a steam-containing overhead stream at the top of said reactor; and g) recovering a product stream from the bottom of said reactor, said product stream comprising nylon 6 polymer having less than about 20 gram equivalents of unreacted nitrile end groups per million grams of nylon 6.

2. The process of claim 1 wherein the dehydration catalyst is selected from the group consisting of:

(a) metal oxides selected from the group consisting of aluminum oxide, thorium oxide, cerium oxide, zirconium oxide, titanium dioxide, chromium sesquioxide, blue tungsten oxide, beryllium oxide, uranous oxide, vanadium oxide, magnesia, blue molybdenum oxide, ferrous oxide;

(b) oxides of silica or boron;

(c) sulfates, phosphates and the silicates of aluminum, thorium, cerium, zirconium; and (d) acids selected from the group consisting of magnesium, phosphoric acid, silicotungstic acid, phosphomolybdic acid and borophosphoric acid.

3. The process of claim 1 wherein the reactor is operated at a pressure of 400 to 800 psig (2.76 to 5.52 MPa) and the temperature at the top of said reactor is 230 to 250 degrees C.

4. The process of claim 1 wherein the second feed stream additionally comprises an oxygen-containing phosphorus compound and said reactor is operated at a pressure of 100 to 300 psig (0.69 to 2.07 MPa) and the temperature at the top of said reactor is 190 to 220 degrees C.

5. The process of claim 4 wherein the oxygen-containing phosphorous compound is at least one compound selected from the group consisting of phosphorous acid, alkyl- and aryl-substituted phosphonic acid, hypophosphorous acid, phosphoric acid, and alkyl- and aryl-phosphinic acid.

6. The process of claim 5 wherein the oxygen-containing phosphorous compound is present in an amount of 0.05 to 0.3 weight percent relative to all organic material in the second feed stream.

7. The process of claim 6 wherein the oxygen-containing phosphorous compound is selected from the group consisting of phosphoric acid, phosphorous acid, phenyl phosphinic acid, and 2-(2'-pyridyl) ethyl phosphonic acid.

8. The process of claim 7 wherein the oxygen-containing phosphorous compound is in an amount of 0.1 to 0.2 weight percent relative to all organic material in the second feed stream.

* * * * *